United States Patent [19]
Boylan

[11] 3,910,553
[45] Oct. 7, 1975

[54] METERING VALVE

[75] Inventor: John R. Boylan, Cleveland Heights, Ohio

[73] Assignee: Nupro Company, Cleveland, Ohio

[22] Filed: Apr. 11, 1974

[21] Appl. No.: 460,238

Related U.S. Application Data

[63] Continuation of Ser. No. 300,708, Oct. 25, 1972, abandoned.

[52] U.S. Cl. ................ 251/205; 251/225; 251/214
[51] Int. Cl.² ......................................... F16K 31/50
[58] Field of Search ........... 251/214, 223, 225, 205; 137/454.5

[56] References Cited
UNITED STATES PATENTS

| | | | |
|---|---|---|---|
| 1,833,193 | 11/1931 | Wray | 251/225 X |
| 2,039,638 | 5/1936 | Druge et al. | 137/454.5 |
| 2,310,558 | 2/1943 | Teeters et al. | 251/214 |
| 2,496,176 | 1/1950 | Powers | 251/225 X |
| 2,920,643 | 1/1960 | Terrett | 251/214 X |
| 2,994,343 | 8/1961 | Banks | 137/454.5 |
| 3,240,230 | 3/1966 | Callahan et al. | 251/214 X |
| 3,356,335 | 12/1967 | Koch et al. | 251/214 |
| 3,529,805 | 9/1970 | Callahan et al. | 251/214 X |

FOREIGN PATENTS OR APPLICATIONS

| | | | |
|---|---|---|---|
| 716,166 | 10/1931 | France | 251/225 |
| 1,291,720 | 3/1962 | France | 251/223 |

*Primary Examiner*—Henry T. Klinksiek
*Attorney, Agent, or Firm*—Fay & Sharpe

[57] ABSTRACT

The specification and drawings disclose a metering valve comprising a valve body having an inlet and an outlet with a metering orifice therebetween. A tapered needle member is adapted to enter the metering orifice. The needle is carried at the end of a stem extending laterally into the body. The stem is threadedly mounted in a bonnet for longitudinal adjustment to vary the position of the needle in the orifice to thereby regulate flow. Positioned between the body and the bonnet is a body extension member releasably connected to the body and having a bore through which the stem extends. The bore includes an inner portion which closely receives the stem and a larger diameter outer portion. A resilient guide ring is carried in the outer portion and closely surrounds the stem. The bonnet is threadedly connected to the body extension member and arranged to engage the guide ring to apply thereto a compressive load and produce tight but sliding engagement between the guide ring and the stem.

4 Claims, 5 Drawing Figures

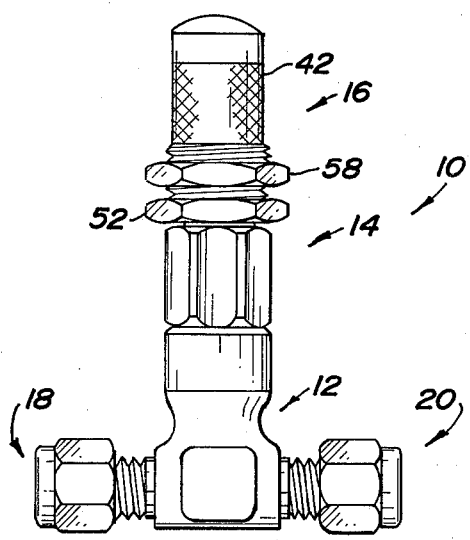
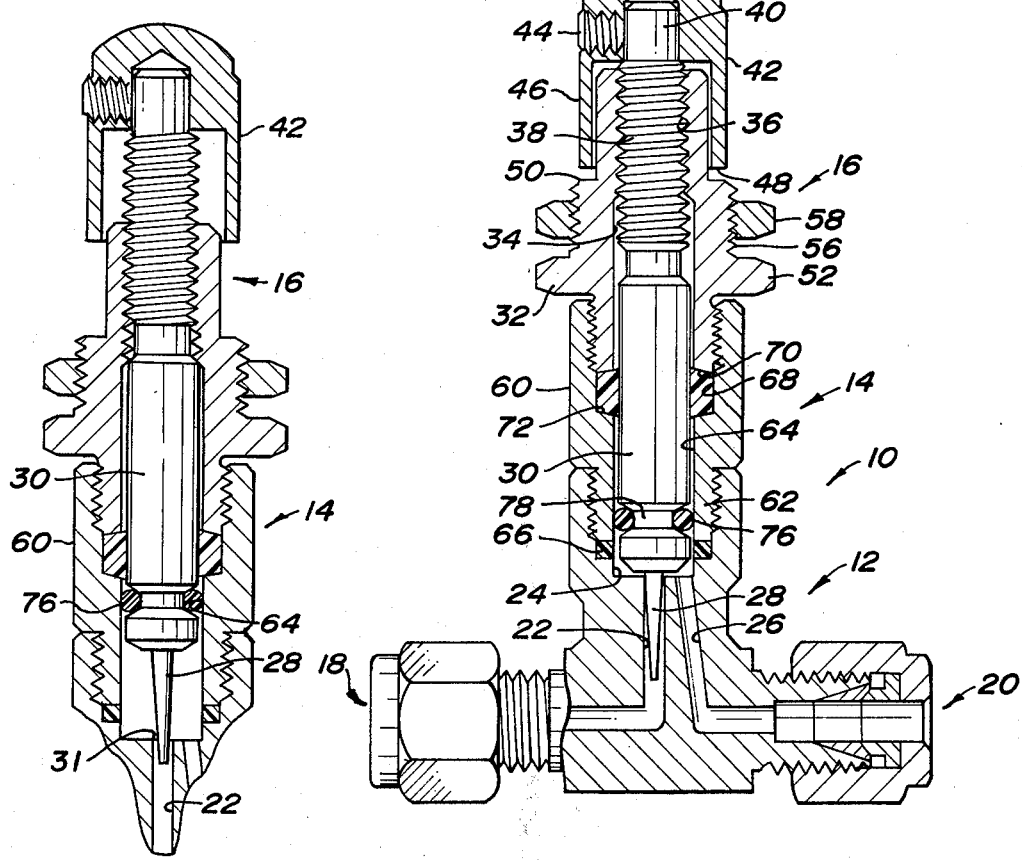

METERING VALVE

This is a continuation of application Ser. No. 300,708 filed Oct. 25, 1972, now abandoned.

BACKGROUND OF THE INVENTION

The subject invention is directed toward the valve art and, more particularly, to a metering valve having improved stability.

The invention is especially suited for use in needle-type metering valves for controlling fine flows and will be described with particular reference thereto; however, as will become apparent, the invention is capable of broader application and use.

Valves used for metering fine flows typically comprise a needle member carried at the end of the stem and adapted to enter a flow orifice in the valve body between the inlet and outlet. Generally, the stem is threadedly received in a bonnet member attached to the body. An O-ring or the like is carried on the stem for sealing.

One of the problems with metering valves of the type described is that vibration can cause drift of the stem and loss of setting. Additionally, the inherent play in the stem actuating threads makes it difficult to assure setting reproducibility.

BRIEF DESCRIPTION OF THE INVENTION

The subject invention overcomes the above-mentioned problems and provides a metering valve which is particularly stable and permits extreme accuracy in setting and maintaining exact flow rates. In accordance with the invention, a valve of the type described is provided with a valve body extension member positioned between the body and the bonnet. The extension member has a through bore which includes an inner portion that closely and slidably receives the stem and an outer portion having a diameter substantially larger than the stem. A resilient guide ring member formed from glass-filled polytetrafluoroethylene or the like is positioned in the outer portion of the bore and closely surrounds the stem. The portion of the stem which is closely received in the inner portion of the bore carries a seal ring which provides a fluid seal between the stem and the bore. The bonnet is threadedly connected to body extension member and has an inner end adapted to apply a compressive load to the guide ring to cause the guide ring to relatively tightly engage the stem.

The body extension member between the body and the bonnet requires the use of a somewhat longer stem member than was used in the prior art metering valves; however, the presence of the intermediate guide ring made possible by the extension provides substantial advantages. First, the stem is guided at three points along its length i.e., the seal ring, the guide ring, and the actuating threads. Secondly, the guide ring produces a controlled drag on the stem. Additionally, the guide ring dampens and/or eliminates minute stem vibrations and drift. As a consequence, the valve can maintain exact flow rates and allows extreme accuracy in setting.

Accordingly, a primary object of the invention is the provision of a metering valve having means which eliminate stem vibration and drift resulting therefrom.

A further object is the provision of a valve of the type described wherein the stem is guided by an intermediate guide ring located in a separable body extension section.

Yet another object is the provision of a valve of the type discussed which the compression of the guide ring can be easily adjusted.

BRIEF DESCRIPTION OF THE DRAWINGS

The above and other objects and advantages will become apparent from the following description when read in conjunction with the accompanying drawings wherein:

FIG. 1 is a side elevational view of a metering valve embodying the invention;

FIG. 2 is a cross-sectional view of the valve of the FIG. 1;

FIG. 3 is a cross-sectional view through the body extension portion of the valve of FIG. 1 showing the needle in its fully retracted position;

DETAILED DESCRIPTION OF THE DRAWINGS

Figure 4:
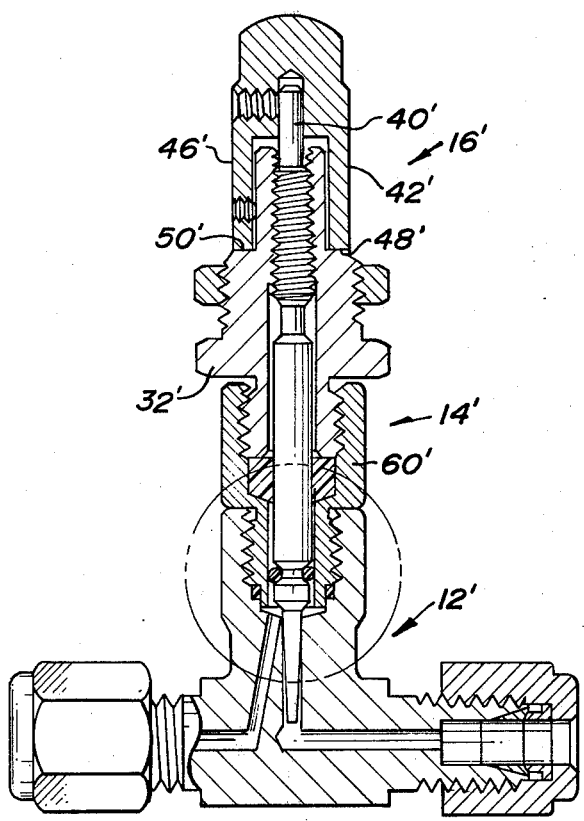
FIG. 4 is a cross-sectional view similar to FIG. 2 showing a modified form of the invention; and, FIG. 5 is an enlarged view of the circled portion of FIG. 4.

Referring more particularly to the drawings wherein the showings are for the purpose of illustrating preferred embodiments of the invention only, and not for the purpose of limiting the same, FIGS. 1 through 3 show a valve 10 including a body portion 12, an intermediate body extension 14, and a bonnet and adjusting assembly 16. In the embodiment under consideration, the body 12 is formed from any suitable material such as stainless steel and includes an inlet 18 and an aligned outlet 20. Inlet and outlet 18 and 20 are shown as being provided with swage type fittings to allow the valve to be readily connected to associated piping or tubing. The particular type of fittings provided form no part of the invention.

The inlet 18 is connected with a vertically extending passage 22 aligned with an enlarged threaded bore 24 which defines a valve chamber. The outlet 20 is in flow communication with a passage 26 which connects with the valve chamber.

The quantity of flow taking place through the valve chamber is controlled by a relatively small tapered needle member 28 carried at the lower end of a stem member 30. As shown, longitudinal movement of the stem 30 acts to move the needle 28 to vary the flow area about the orifice 31 at the upper or outlet end of passage 22.

Stem 30 is mounted for adjustable movement in a bonnet nut member 32 carried by the body extension 14. As shown, the bonnet nut has a through bore 34 which is threaded at its upper end 36. Cooperating threads 38 are formed on the outer end of the stem member 30 and are received in the threaded portion 36 of bore 34. The outermost end 40 of stem 30 has an operating or adjusting handle 42 connected thereto by a set screw 44. Additionally, it should be noted that handle 42 includes a downwardly extending cylindrical section 46 which encloses the threads when the stem is fully retracted to its outermost position. Although not of importance to the subject invention, it should be noted that an outwardly extending flange 52 is provided on the bonnet nut member 32 so as to permit the bonnet nut to be readily removed from the body extension 14. Additionally, the bonnet nut is exteriorly threaded at 56 for receiving a panel mounting nut 58.

The portion of the valve thus far described is relatively conventional. Of particular importance to the invention, however, is the intermediate body extension assembly 14. As shown, the body extension assembly 14 includes an extension member 60 having a threadedly lower end 62 adapted to be received in the threaded outer end of the bore 24. The extension member 60 has a through bore 64 which is of a diameter substantially equal to the inner end of bore 24. Positioned between the lower end of member 60 in a shoulder formed within bore 24 is a resilient seal or gasket member 66 which provides a fluid tight seal between body 12 and member 60. As can be seen, tightening membeer 60 to body 12 compresses the gasket 66.

The outer end of the bore 64 of member 60 is counterbored to a somewhat larger diameter. Positioned within the counterbore is a guide ring member 68 which is formed from glass-filled polytetrafluoroethylene (TFE) or the like. The lower end 70 of the bonnet nut member 32 is arranged to engage the upper surface of the guide ring 68. As can be appreciated, tightening of the bonnet nut 32 causes compression of the guide ring 68 and produces engagement of the stem. Preferably, the lower end 70 of the bonnet nut member 32 and the shoulder 72 at the juncture of bore 64 of the enlarged counterbore portion are inclined in the manner shown so as to increase the radially inwardly acting components of the compressive force produced by tightening of the bonnet nut.

Guide ring member 68 is not intended to function as a fluid seal but rather, serves as a guide and vibration dampening member for the stem 30. Additionally, it puts a controllable drag on the stem to eliminate the effects of play in the actuating threads or vibrations in the valve.

A seal is achieved between the stem and the body extension member 60 by an O-ring 76 carried in a groove 78 formed about the lower end of stem 30. As best shown in FIG. 3, the relationship between the body extension member 60 and the stem is such that when the stem is moved to its uppermost position the needle 28 is substantially entirely within the body extension member 60. This permits the entire body extension member and the bonnet nut and actuating assembly to be removed from the valve with the needle in a concealed or shielded position to prevent inadvertent damage thereto. Moreover, it should be noted that the O-ring seal 76 is always protected within the extension member 60 irrespective of the position of the stem 30.

Figure 5:
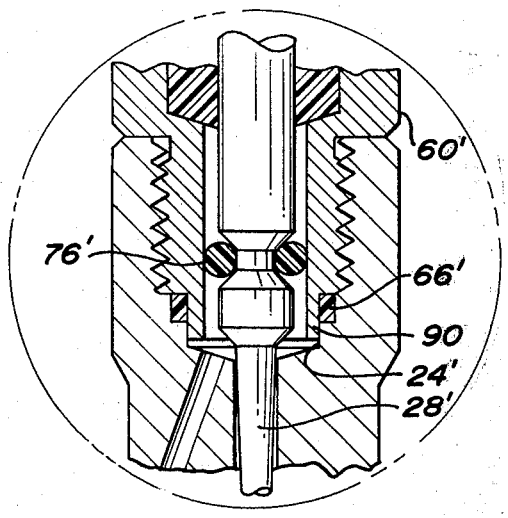

FIGS. 4 and 5 show a second embodiment of the invention which differs only slightly from the embodiment of FIGS. 1 through 3. Accordingly, corresponding elements have been identified with the same reference numerals used with respect to the FIGS. 1 through 3 embodiment but differentiated therefrom by the addition of a prime suffix. Thus, the description of a FIG. 1 element is to be taken as equally applicable to a FIG. 2 element unless otherwise noted.

One of the primary differences between the FIG. 4 and 5 embodiment compared to the FIGS. 1 through 3 embodiment is in the arrangement of the lower end of the body extension member 60'. As shown, the body extension member 60' includes a cylindrical, axially extending flange 90 which is arranged to be received within the gasket 66' and the bore 24'. This arrangement shields the gasket 66' and, further, by properly sizing the gasket 66' relative to the diameter of the flange 90 the gasket will be retained on the body extension member 60' when it is removed from the valve. This greatly simplifies replacement of the gasket 66'.

Additionally, the lower edge 48' of the flange 46' is located so as to engage surface 50' of the bonnet nut 32' when the valve is in its minimum flow position. This arrangement provides a dead stop to prevent overtightening of the valve.

The invention has been described in great detail sufficient to enable one of ordinary skill in the art to make and use the same. Obviously, modifications and alterations of the preferred embodiment will occur to others upon reading and understanding of the specification and it is our intention to include all such modifications and alterations as part of our invention insofar as they come within the scope of the appended claims.

What is claimed is:
1. A metering valve including:
 a body having an inlet and an outlet with a flow metering orifice positioned therebetween;
 a stem member extending laterally into said body;
 a tapered flow metering needle member carried by said stem and aligned with said orifice;
 a bonnet member in which said stem is threadedly carried for adjusting movement to selectively vary the position of said needle member relative to said orifice;
 an elongated body extension member having an inner end connected to said body and an outer end connected to said bonnet, a bore extending through said extension member and receiving said stem, the inner end of said extension member being threaded and received in threads formed in said body with a gasket between said inner end and said body at a location inwardly of said threads, the outer end of said bore being counterbored to a diameter substantially larger than said stem and terminating in a bottom wall which is inclined at an arcuate angle relative to said stem, a resilient guide ring member positioned in said counterbore and closely surrounding said stem, the length of said bore inwardly of said guide ring being sufficiently long such that when said stem is adjusted to its outermost position a major portion of said needle member is disposed within said bore whereby said extension member can be removed from said body with said needle shielded by said extension member;
 said bonnet member being threadedly received in said counterbore and adapted to apply a compressive force to said guide ring to cause it to relatively tightly engage said stem and generally conform to the configuration of the bottom wall of said counterbore; and,
 a seal ring carried by said stem at a location inwardly of said guide ring, said seal ring comprising an O-ring received in a groove formed on said stem, said O-ring being located such that it is always within said bore and outwardly of said gasket irrespective of the position of adjustment of said stem.

2. The valve as defined in claim 1 wherein said guide ring member is formed from glass-filled polytetrafluoroethylene.

3. The valve as defined in claim 1 wherein said gasket is received about the inner end of said extension member.

4. The valve as defined in claim 1 wherein said extension member is threadedly received in a bore formed in said valve body and aligned with said orifice.

* * * * *